(12) United States Patent
Tsuchihashi et al.

(10) Patent No.: US 9,845,007 B2
(45) Date of Patent: Dec. 19, 2017

(54) DRIVING FORCE DISTRIBUTING DEVICE

(71) Applicant: HONDA MOTOR CO., LTD., Tokyo (JP)

(72) Inventors: Makoto Tsuchihashi, Wako (JP); Sachi Fujinuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/111,527

(22) PCT Filed: Dec. 24, 2014

(86) PCT No.: PCT/JP2014/084047
§ 371 (c)(1),
(2) Date: Jul. 14, 2016

(87) PCT Pub. No.: WO2015/118787
PCT Pub. Date: Aug. 13, 2015

(65) Prior Publication Data
US 2016/0325623 A1   Nov. 10, 2016

(30) Foreign Application Priority Data
Feb. 10, 2014   (JP) ................................. 2014-023069

(51) Int. Cl.
*B60K 23/08*      (2006.01)
*F04C 14/18*     (2006.01)
(Continued)

(52) U.S. Cl.
CPC .......... *B60K 23/0808* (2013.01); *B60K 17/35* (2013.01); *F04C 2/3446* (2013.01);
(Continued)

(58) Field of Classification Search
None
See application file for complete search history.

(56) References Cited

U.S. PATENT DOCUMENTS 4,874,059 A * 10/1989 Kasegawa .......... B60K 23/0808
                                                             180/197
5,141,072 A *  8/1992 Shibahata .............. B60K 17/35
                                                             180/245
(Continued)

FOREIGN PATENT DOCUMENTS

JP    57-018488 A    1/1982
JP    2004-019769 A  1/2004
(Continued)

OTHER PUBLICATIONS

Written Opinion of the International Searching Authority dated Mar. 31, 2015 corresponding to International Patent Application No. PCT/JP2014/084047 and English translation thereof.
(Continued)

*Primary Examiner* — Mark A Manley
(74) *Attorney, Agent, or Firm* — Squire Patton Boggs (US) LLP

(57) ABSTRACT

A driving force distributing device includes a single pump for supplying control hydraulic pressure to each of first and second hydraulic clutches, an electric motor for driving the pump, a flow rate variable mechanism for changing a ratio of flow rate of hydraulic fluid supplied to each of the first and second hydraulic clutches and a controlling means for controlling the electric motor and the flow rate variable mechanism. The driving force distributing device can variably control a flow rate of hydraulic fluid supplied to first and second hydraulic clutches based on changing a ratio of flow rate of hydraulic fluid supplied to the first and second hydraulic clutches in the flow rate variable mechanism and a control of changing rotational speed of the pump using the motor.

9 Claims, 5 Drawing Sheets

(51) Int. Cl.

| | | |
|---|---|---|
| *F04C 15/06* | (2006.01) | |
| *F16D 25/10* | (2006.01) | |
| *F04C 2/344* | (2006.01) | |
| *F16D 48/02* | (2006.01) | |
| *F04C 14/22* | (2006.01) | |
| *B60K 17/35* | (2006.01) | |
| *F16H 48/22* | (2006.01) | |
| *F16H 48/32* | (2012.01) | |
| *F16D 121/04* | (2012.01) | |

(52) U.S. Cl.
CPC ............ *F04C 2/3448* (2013.01); *F04C 14/18* (2013.01); *F04C 14/223* (2013.01); *F04C 15/06* (2013.01); *F16D 25/10* (2013.01); *F16D 25/14* (2013.01); *F16H 48/22* (2013.01); *F16H 48/32* (2013.01); *B60K 2023/0833* (2013.01); *F04C 2240/30* (2013.01); *F04C 2270/0525* (2013.01); *F16D 2121/04* (2013.01)

(56) References Cited

U.S. PATENT DOCUMENTS

| | | | |
|---|---|---|---|
| 8,668,615 B2* | 3/2014 | Schmidt | ........... F16D 25/082 475/221 |
| 8,708,123 B2 | 4/2014 | Nilsson et al. | |
| 8,887,886 B2 | 11/2014 | Akiba et al. | |
| 2009/0032360 A1 | 2/2009 | Asano | |

FOREIGN PATENT DOCUMENTS

| | | |
|---|---|---|
| JP | 2009-079757 A | 4/2009 |
| JP | 2011-149535 A | 8/2011 |
| JP | 2013-506601 A | 2/2013 |
| WO | 2011/089825 A1 | 7/2011 |

OTHER PUBLICATIONS

International Search Report dated Mar. 31, 2015 corresponding to International Patent Application No. PCT/JP2014/084047 and English translation thereof.

\* cited by examiner

US 9,845,007 B2

DRIVING FORCE DISTRIBUTING DEVICE

TECHNICAL FIELD

The present invention relates to a driving force distributing device for distributing driving force from a driving source to each of a pair of driving wheels.

BACKGROUND ART

As a conventional art, as disclosed in Patent Document 1, a driving force distributing device configured in a manner that a left hydraulic clutch and a right hydraulic clutch are arranged respectively on left and right sides of a hypoid gear or a bevel gear coupled to a rear end of a propeller shaft for distributing driving force (so-called "torque distribution") transmitted from a driving source such as an engine to each of a pair of left and right wheels (left and right rear wheels) is known to be available.

The driving force distributing device disclosed in Patent Document 1 is configured to regulate pressure of hydraulic fluid discharged from an oil pump driven by an electric motor using a linear solenoid valve (pressure regulating valve), and due to this hydraulic pressure of hydraulic fluid, selectively engage two hydraulic clutches installed to each of left and right axles of the rear wheels. And, a hydraulic fluid supply device for supplying hydraulic fluid to the two hydraulic clutches includes two oil pumps respectively corresponding to the two hydraulic clutches and two linear solenoid valves for regulating pressure of hydraulic fluid discharged from the two oil pumps.

However, in this configuration, each of the two hydraulic clutches requires a pair of oil pump and rear solenoid valve, possibly leading to increase in size, weight and cost of the structure of the hydraulic pressure supply device.

Moreover, a hydraulic control device of a wet-type multiple disc clutch disclosed in Patent Document 2 is configured to send hydraulic fluid to a wet-type multiple disc clutch using an oil pump driven by an electric motor.

In the hydraulic control device disclosed in Patent Document 2, one wet-type multiple disc clutch involves one set of an oil pump, an electric motor and a motor driver. Thus, this configuration requires two sets of the oil pump, the electric motor and the motor driver are required for hydraulic control of each of the pair of right and left hydraulic clutches. Therefore, in this case also, having a large parts count, the hydraulic pressure supply device might increase in size, weight and cost of the structure.

RELATED ART DOCUMENTS

Patent Documents

[Patent Document 1] Japanese Patent Laid-Open No. 2011-149535
[Patent document 2] Japanese Patent Laid-Open No. 2004-19769

DISCLOSURE OF THE INVENTION

Problems to be Solved by the Invention

The present invention was made in view of a point of the above-mentioned, and the purpose is to provide a driving force distributing device that can control driving force distributed to each of a pair of driving wheels by separately controlling a flow rate of hydraulic fluid supplied to each of two hydraulic clutches in a simple configuration with a small parts count.

Means of Solving the Problems

In order to solve the above-described problems, a driving force distributing device in accordance with the present invention includes a first hydraulic clutch (CL) and a second hydraulic clutch (CR) for distributing driving force from a driving source (E) respectively to a pair of driving wheels (WRL, WRR). The driving force distributing device distributes driving force to each of the pair of driving wheels (WRL, WRR) by variably controlling engaging force of each of the first and second hydraulic clutches (CL, CR) in response to running conditions of a vehicle. The driving force distributing device also includes a single pump (10) for supplying control hydraulic pressure to each of the first hydraulic clutch (CL) and the second hydraulic clutch (CR), an electric motor (36) for driving the oil pump (10), a flow rate variable mechanism (40) for changing ratio of flow rate of hydraulic fluid supplied to the first and second hydraulic clutches (CL, CR) from the pump (10), and a control means (45) for controlling the electric motor (36) and the flow rate variable mechanism (40). The driving force distributing device is characterized as controlling driving force distributed to each of the pair of the driving wheels (WRL, WRR) by variably controlling the flow rate of hydraulic fluid supplied from the pump (10) to each of the first and second hydraulic clutches (CL, CR) separately, on the basis of a control of changing the ratio of flow rate of hydraulic fluid supplied to each of the first and second hydraulic clutches (CL, CR) from the pump (10) in the flow rate variable mechanism (40) and a control of rotational speed of the pump (10) using the electric motor (36).

According to the driving force distributing device in accordance with the present invention, the flow rate of hydraulic fluid supplied to the first hydraulic clutch and the flow rate of hydraulic fluid supplied to the second hydraulic clutch can be variably controlled separately in a simple configuration with the single pump. This requires neither two sets of the pump and the linear solenoid valve as conventional as a configuration for controlling the first and second hydraulic clutches separately, nor two pumps and two sets of the electric motor and the motor driver for driving the two pumps. Therefore, in a simple configuration with a small parts count, driving force distributed to each of the pair of driving wheels can be controlled by separately controlling the flow rate of hydraulic fluid supplied to the two hydraulic clutches.

Furthermore, in the above-described driving force distributing device, the oil pump (10) includes a housing (11), a rotor (22) rotatably installed inside of the housing (11), first and second oil chambers (H1, H2) defined on a peripheral side of the rotor (22) inside of the housing (11), first and second inlet ports (P1, P2) for sucking hydraulic fluid into the first and second oil chambers (H1, H2), and first and second discharge ports (Q1, Q2) for discharging hydraulic fluid from the first and second oil chambers (H1, H2). The above-described flow rate variable mechanism (40) may be a mechanism to change ratio between a capacity of the first oil chamber (H1) and a capacity of the second oil chamber (H2).

According to this configuration, in the pump, having the two sets of inlet and discharge ports, which establishes two routes to discharge destination of hydraulic fluid by performing a suction and discharge process multiple times in a single rotation of the rotor, the flow rate of hydraulic fluid discharged from each of the first and second discharge ports can be variably controlled separately on the basis of the control of changing the ratio between the capacity of the first oil chamber and the capacity of the second oil chamber and the control of rotational speed of the rotor using the electric motor.

Also, in the above-described driving force distributing device, the flow rate variable mechanism (40) may be a moving mechanism (40) for moving the housing (11) or a member (30) mounted to the housing (11) relatively to the rotor (22) and the rotating shaft (21).

According to this configuration, a movement of the housing or the member mounted to the housing relative to the rotor and the rotating shaft using the moving mechanism can change the ratio between the capacity of the first oil chamber and the capacity of the second oil chamber. Accordingly, the flow rate of hydraulic fluid discharged from each of the first and second discharge ports can be variably controlled separately in a simple configuration and control.

Also, in the above-described driving force distributing device, the first and second discharge ports (Q1, Q2) of the pump (10) are connected respectively to cylinder chambers (81, 92) of the first and second hydraulic clutches (CL, CR). Thus, driving force may be distributed to each of the pair of left and right driving wheels (WRL, WRR) by variably and separately controlling the flow rate of hydraulic fluid supplied from the first and second discharge ports (Q1, Q2) respectively to the first and hydraulic clutches (CL, CR).

According to this configuration, driving force can be distributed to each of the pair of driving wheels by variably and separately controlling the flow rate of hydraulic fluid supplied from the first and second discharge ports respectively to the first and second hydraulic clutches. Therefore, the driving force distributing device according to the present invention can separately control each of the plurality of hydraulic clutches even in a simple configuration only with the single pump.

Furthermore, the pump with which the above-described driving force distributing device is provided may be a vane-type hydraulic pump including a plurality of vanes (24) held by the rotor (22). It should be noted that the bracketed reference numerals are examples of the elements of the embodiment described later.

Effects of the Invention

According to the driving force distributing device in accordance with the present invention, the flow rate of hydraulic fluid supplied to the two hydraulic clutches can be controlled separately in a simple configuration with a small parts count, enabling to control driving force distributed to each of the pair of driving wheels.

BRIEF DESCRIPTION OF THE DRAWINGS

FIG. 5A and FIG. 5B are views illustrating changes in capacity (discharge rate) of a vane pump, of which FIG. 5A shows a state in which the first oil chamber and the second oil chamber are same in capacity, and FIG. 5B shows a state in which the first oil chamber and the second oil chamber are different in capacity.

MODE FOR CARRYING OUT THE INVENTION

Figure 1:
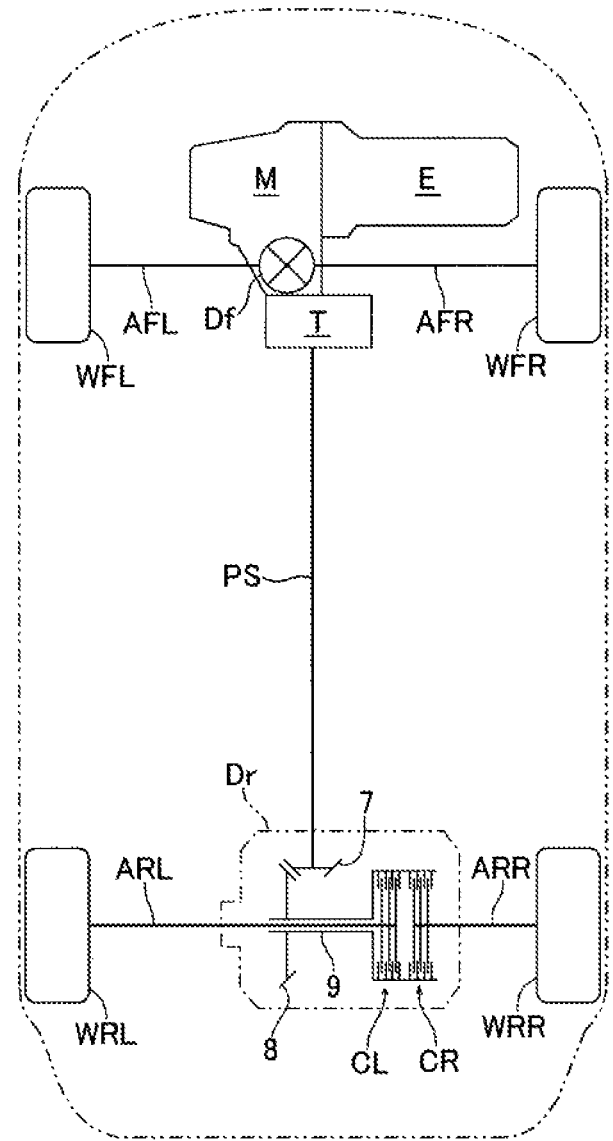
FIG. 1 is a view illustrating a driving power transmission route of a four-wheel drive vehicle according to one embodiment of the present invention.

Hereinafter, an embodiment of the present invention will be described in detail with reference to the appending drawings. FIG. 1 is a view illustrating a driving power transmission route of a four-wheel drive vehicle according to one embodiment of the present invention. The vehicle shown in FIG. 1 is a four-wheel drive vehicle based on a front engine/front wheel drive vehicle and includes front wheels WFL, WFR serving as main driving wheels and rear wheels WRL, WRR serving as auxiliary driving wheels. To the front wheels WFL, WFR, driving force from an engine (driving source) E is transmitted via a transmission M, a front differential Df and left and right axles AFL, AFR. To the rear wheels WRL, WRR, part of driving force of the front wheels WFL, WFR is transmitted via a transfer T, a propeller shaft PS, a rear differential Dr and left and right axles ARL, ARR.

The rear differential Dr includes a left clutch (first hydraulic clutch) CL and a right clutch (second hydraulic clutch) CR for transmitting driving force, transmitted to a sleeve 9 from the propeller shaft PS via a driving bevel gear 7 and a driven bevel gear 8 selectively to a left axle ARL and a right axle ARR. In other words, the left hydraulic clutch CL and the right hydraulic clutch CR are to distribute driving force (so-called torque distribution), transmitted via the propeller shaft PS from the engine E respectively to the left and right rear wheels WRL, WRR.

Figure 2:
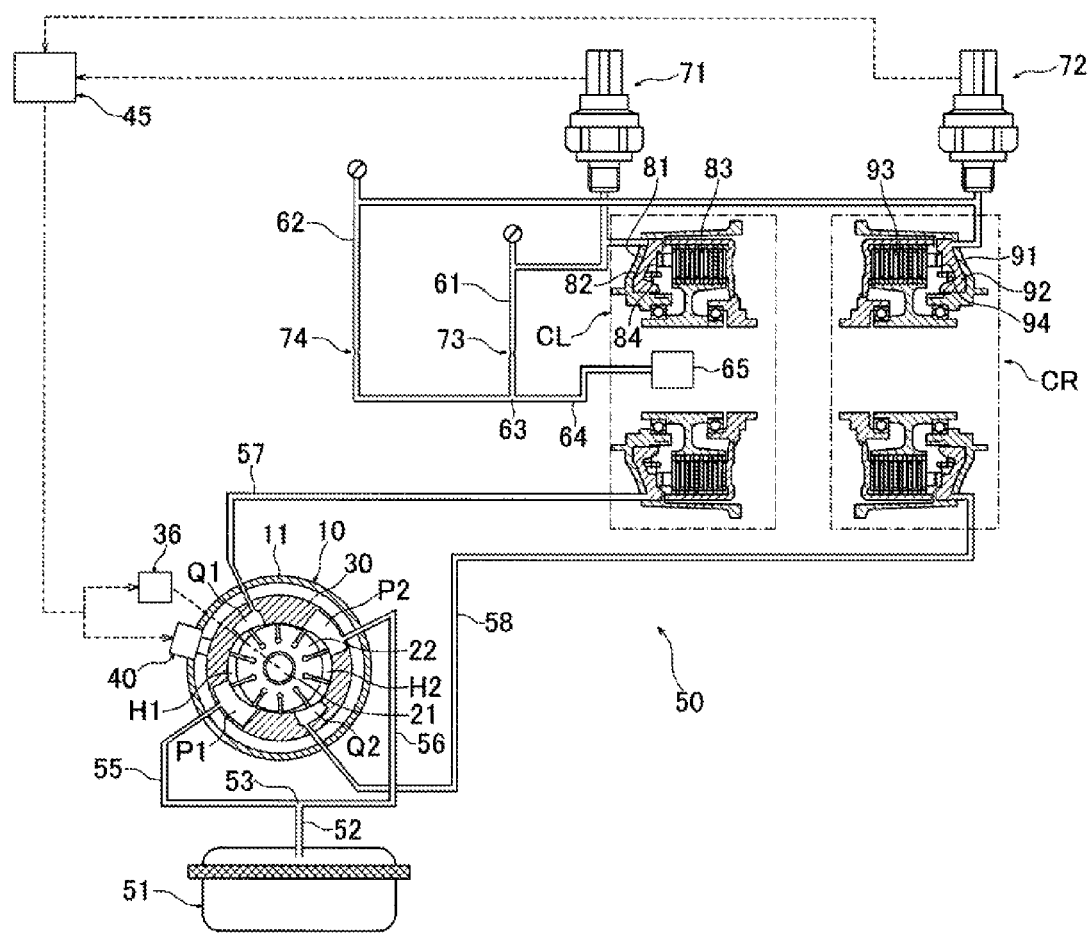
FIG. 2 is a view illustrating a hydraulic pressure supply device including a variable capacity-type vane pump.
Figure 3:
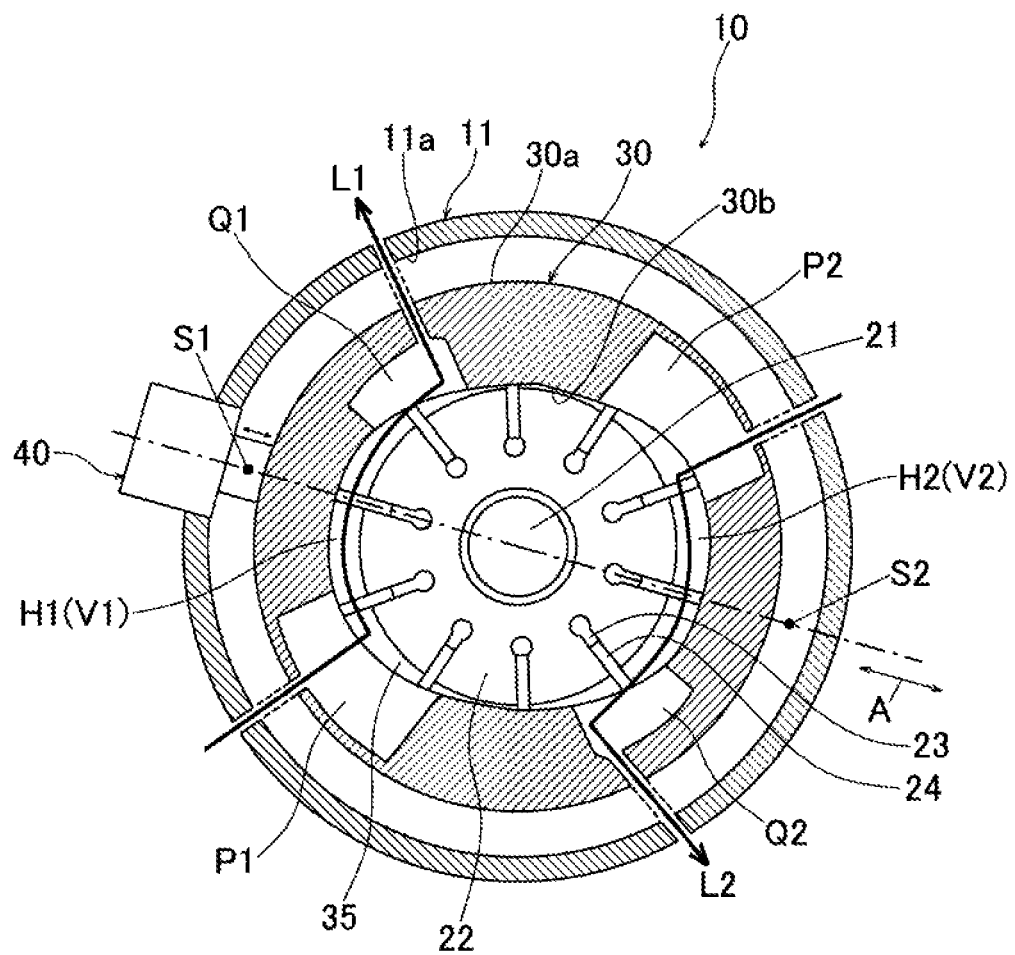
FIG. 3 is a sectional view of a vane pump viewed from the axial direction.
Figure 4:
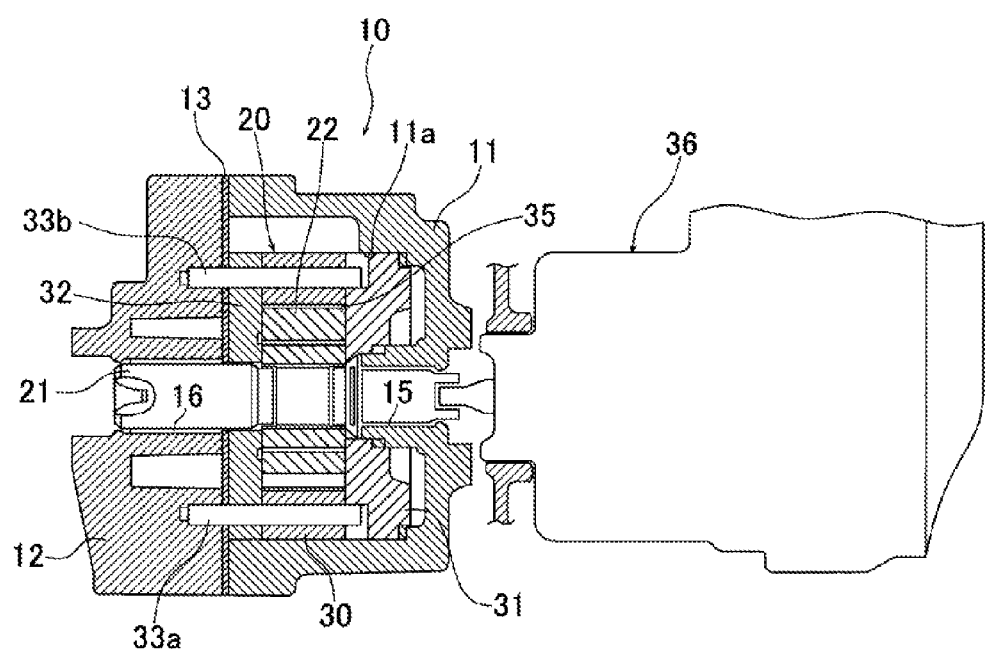
FIG. 4 is a sectional view of a vane pump viewed from a side direction with respect to the axial direction.

FIG. 2 is a view illustrating a configuration of a hydraulic pressure supply device for supplying hydraulic pressure of hydraulic fluid to the right hydraulic clutch CR and the left hydraulic clutch CL. The hydraulic pressure supply device 50 shown in the figure includes a variable capacity-type vane pump 10. FIGS. 3 and 4 are views illustrating a vane pump 10, of which FIG. 3 is a sectional view viewed from the axial direction, and FIG. 4 is a sectional view viewed from the side direction with respect to the axial direction. As shown in FIGS. 3 and 4, the vane pump 10 is an electric pump driven by rotation of the electric motor 36 (see FIG. 4) and has a housing 11 including a concave section (housing chamber) 11a for housing a pump unit 20, a cover plate 12 for covering an opening of the concave section 11a of the housing 11, and a seal plate 13 sandwiched between the housing 11 and the cover plate 12. The housing 11, the cover plate 12 and the seal plate 13 are fastened and fixed by a plurality of bolts (not shown in the figure). The seal plate covers and seals a plurality of passage grooves or a plurality of thinning grooves formed on the housing 11 and the cover plate 12.

The vane pump 10 pivotally supports a rotating shaft 21 of the pump unit 20 to bearings 15, 16 provided to the housing 11 and the cover plate 12 and disposes a rotor 22 fixedly connected via a serration to this rotating shaft 21 in the concave section 11a of the housing 11. The rotating shaft 21 and the rotor 22 rotate by power of the electric motor 36.

As shown in FIG. 3, at each of a plurality of positions along the circumferential direction, the rotor 22 houses the plurality of vanes 24 retractably in a plurality of grooves provided in the radial direction (diameter direction) and disposes each of the vanes 24 slidably in the radial direction along a vane ditch 23. The rotor 22 has the vane ditch 23 opened to an outer periphery and to a surface of both sides.

As shown in FIG. 4, in the concave section 11a of the housing 11, the pump unit 20 is fit so that an inner side plate 31, a cam ring 30 and an outer side plate 32 are laminated in this order from the deep side of the concave section 11a. The inner side plate 31, the cam ring 30 and the outer side plate 32, together with the seal plate 13 attached to the outer side plate 32, are skewed by locating pins 33a, 33b to be positioned in the circumferential direction and fixedly held by the cover plate 12 from the lateral direction.

The cam ring 30 is cylindrical in shape, having a circular outer periphery 30a and an inner periphery 30b forming a cam surface by a cam curve approximated to an oval, arranged in the concave section 11a of the housing 11 and surrounding the rotor 22.

The inner side plate 31 and the outer side plate 32 constitute a pair of plates sandwiching the rotor 22, the vane 24 and the cam ring 30 from both sides. Thus, the cam ring 30 surrounds the rotor 22 and the vane 24 between both of the side plates 31, 32, forming a pump chamber 35 between the vanes 24, 24 adjacent to the outer periphery of the rotor 22.

The vane pump 10 includes first and second oil chambers H1, H2 defined between an inner side of the cam ring 30 and the outer periphery of the rotor 22, first and second inlet ports P1, P2 for sucking hydraulic fluid into the first and second oil chambers H1, H2, and first and second discharge ports Q1, Q2 for discharging hydraulic fluid from the first and second oil chambers H1, H2. The first oil chamber H1 and the second oil chamber H2 are arranged at positions facing each other on both sides of the rotor 22, or in other words, on both sides thereof in a direction connecting between a middle position S1 and a middle position S2, which will be described later, towards the center of the rotating shaft 21.

In the vane pump 10 of the above-described configuration, hydraulic fluid sucked from the first inlet port P1 while the rotor 22 rotates one time is discharged via the first oil chamber H1 from the first discharge port, and hydraulic fluid sucked from the second inlet port P2 is discharged via the second oil chamber H2 from the second discharge port Q2.

Furthermore, the vane pump 10 includes a moving system (flow rate variable mechanism) 40 for relatively moving the cam ring 30 in the direction perpendicular to the axial direction (of the rotation axis 21) with respect to the rotor 22 and the rotating shaft 21. This moving mechanism 40 is configured with an actuator mechanism for linearly moving the cam ring 30 forward and backward along the direction (of Arrow A in FIG. 3) connecting the middle position S1 between the first inlet port P1 and the first discharge port Q1 (hereinafter referred to simply as "middle position S1") to the middle position S2 between the second inlet port P2 and the second discharge port Q2 (hereinafter referred to simply as "middle position S2").

As shown in FIG. 2, the hydraulic pressure supply unit 50 includes a control section 45 for controlling the electric motor 36 and the moving mechanism 40. A rotational speed of the vane pump 10 (rotor 22) is controlled by controlling the electric motor 36 using the control section 45. Also, a movement of the cam ring 30 (movement forward and backward in the direction of Arrow A) is controlled by controlling the moving mechanism 40 using the control section 45

The movement of the cam ring 30 using the moving mechanism 40 enables changes in ratio between a capacity V1 of the first oil chamber H1 and a capacity V2 of the second oil chamber H2 in the cam ring 30. Also, in the vane pump 10, a control of rotational speed of the electric motor 36 using the control section 45 enables changes in flow rate L1 of hydraulic fluid discharged from the first discharge port Q1 and flow rate L2 of hydraulic fluid discharged from the second discharge port Q2.

Next, another configuration of the hydraulic pressure supply device 50 will be described. In the hydraulic pressure supply device 50, an oil passage 52 in which hydraulic fluid from an oil strainer 51 circulates diverges into an oil passage 55 and an oil passage 56 at a branch section 53. And, the oil passage 55 is connected to the first inlet port P1 of the vane pump 10, and the oil passage 56 is connected to the second inlet port P2. On the other hand, the first discharge port Q1 of the vane pump 10 is connected via an oil passage 57 to a cylinder chamber 81 of the left hydraulic clutch CL. In addition, the second discharge port Q2 of the vane pump 10 is connected via an oil passage 58 to the cylinder chamber 91 of the right hydraulic clutch CR.

Moreover, in the hydraulic pressure supply device 50, an oil passage 61 in which hydraulic fluid from the cylinder chamber 81 of the left hydraulic clutch CL circulates and an oil passage 62 in which hydraulic fluid from the cylinder chamber 91 of the right hydraulic clutch CR circulates are provided. The oil passage 61 and the oil passage 62 converge at a confluence section 63. A downstream side of the confluence section 63 communicates to a lubricating oil passage 64 for supplying hydraulic fluid to a lubricating system 65 of the left hydraulic clutch CL and the right hydraulic clutch CR. In the oil passage 61, a hydraulic pressure sensor 71 is installed for detecting pressure of hydraulic fluid circulating in the oil passage 61. In the oil passage 62, a hydraulic pressure sensor 72 is installed for detecting pressure of hydraulic fluid circulating in the oil passage 62. Also, an orifice 73 is installed in the oil passage 61, and an orifice 74 is installed in the oil passage 62. Signals detected in the hydraulic pressure sensor 71 and the hydraulic pressure sensor 72 are sent to the control section 45, which will be described later.

In the hydraulic pressure supply device 50 of the above-described configuration, hydraulic fluid discharged via the oil passage 57 from the first discharge port Q1 of the vane pump 10 is supplied to the cylinder room 81 of the left hydraulic clutch CL. In the left hydraulic clutch CL, when hydraulic fluid is supplied to the cylinder chamber 81, a clutch piston 82 moves to a friction engagement section 83 side. Then, the friction engagement section 83 is pressed by the clutch piston 82 and thus pressure-welded therewith. Due to this, the left hydraulic clutch CL enters the engaged state. On the other hand, when hydraulic fluid is discharged from the cylinder room 81, the clutch piston 82 moves to the left side by an energizing force of a return spring 84 to release the engagement of the left hydraulic clutch CL.

Also, in the hydraulic pressure supply device 50, hydraulic fluid discharged from the second discharge port Q2 of the vane pump 10 is supplied via the oil passage 58 to the cylinder chamber 91 of the right hydraulic clutch CR. In the right hydraulic clutch CR, when hydraulic fluid is supplied to the cylinder room 91, the clutch piston 92 moves to the friction engagement section 93 side. Then, the friction engagement section 93 is pressed by the clutch piston 92 and then pressure-welded therewith. Due to this, the left hydraulic clutch CL enters the engaged state. On the other hand, when hydraulic fluid is discharged from the cylinder room 91, the clutch piston 92 moves by an energizing force of the return spring 94 in the right direction to release the engagement state of the right hydraulic clutch CR.

Figure 5A:
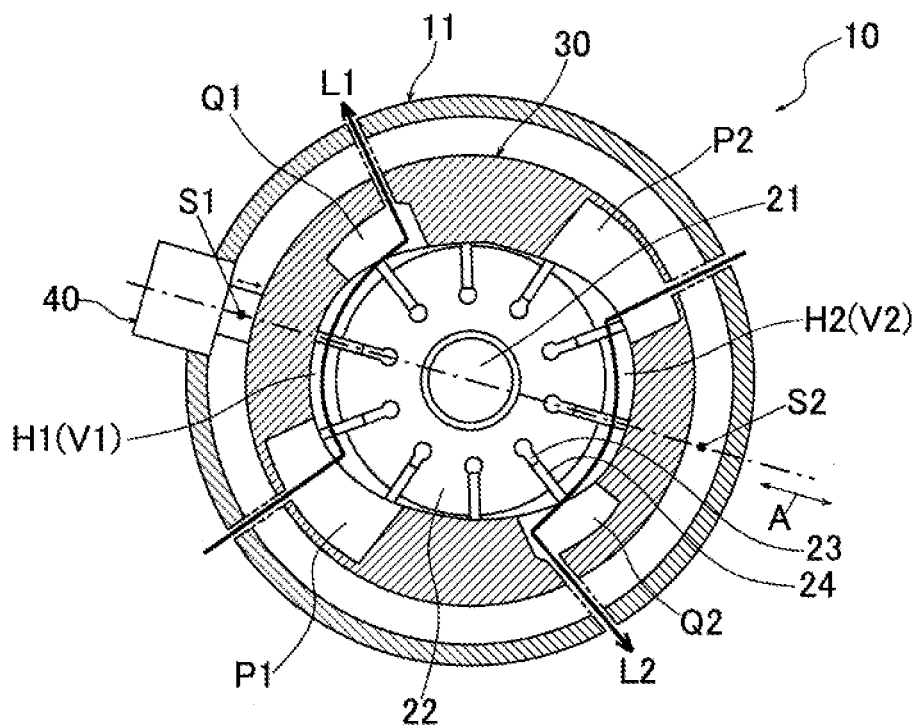
Figure 5B:
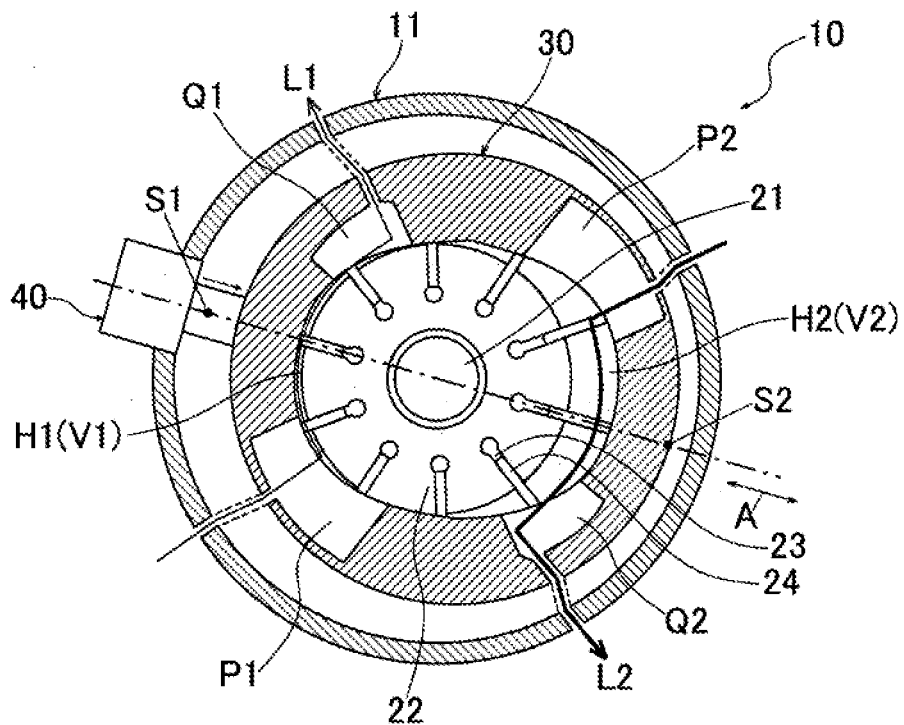

FIGS. 5A and 5B are views illustrating changes in capacity of the vane pump 10 using the moving mechanism 40, of which FIG. 5A shows a state in which the capacity V1 of the first oil chamber H1 is equal to the capacity V2 of the second oil chamber H2, and FIG. 5B shows a state in which the capacity V1 of the first oil chamber H1 is different from the capacity V2 of the second oil chamber H2. In the state shown in FIG. 5A, relative positions of the rotor 22 and the rotating shaft 21 with respect to the cam ring 30 deviate neither to the middle position S1 side, nor to the middle position S2 side. In this state, the capacity V1 of the first oil chamber H1 is equal to the capacity V2 of the second oil chamber H2 (V1=V2). Therefore, the flow rate L1 of hydraulic fluid discharged from the first discharge port Q1 of the vane pump 10 equals the flow rate L2 of hydraulic fluid discharged from the second discharge port Q2. Thus, the left hydraulic clutch CL and the right hydraulic clutch CR are engaged to each other by supplying an equal hydraulic pressure thereto at an equal engagement capacity (engagement power).

On the other hand, in the state shown in FIG. 5B, relative positions of the rotor 22 and the rotating shaft 21 with respect to the cam ring 30 deviate to the middle position S1 side. In this state, the capacity V2 of the second oil chamber H2 is larger than the capacity V1 of the first oil chamber H1 (V1<V2). Therefore, the flow rate L2 of hydraulic fluid discharged from the second discharge port Q2 of the vane pump 10 becomes larger than the flow rate L1 of hydraulic fluid discharged from the first discharge port Q1. Thus, a hydraulic pressure larger than a hydraulic pressure of the left hydraulic clutch CL is supplied to the right hydraulic clutch CR, whereby the right hydraulic clutch CR is engaged at an engagement capacity (engagement power) larger than an engagement capacity of the left hydraulic clutch CL.

In other words, in the state shown in FIG. 5B, the capacity V2 of the second oil chamber H2 between the second inlet port P2 and the second discharge port Q2 becomes larger than the capacity V1 of the first oil chamber H1 between the first inlet port P1 and the first discharge port Q1 (V1<V2). Therefore, a difference occurs between the flow rate L1 of hydraulic fluid discharged from the first discharge port Q1 and the flow rate L2 of hydraulic fluid discharged from the second discharge port Q2. Also, in this case, by changing the amount of movement of the cam ring 30 using the moving mechanism 40, the ratio between the flow rate L1 of hydraulic fluid discharged from the first discharge port Q1 and the flow rate L2 of hydraulic fluid discharged from the second discharge port Q2 can be changed to an arbitrary ratio. In addition to this, by controlling the rotational speed of the electric motor 36, the flow rate L1 of hydraulic fluid discharged from the first discharge port Q1 and the flow rate L2 of hydraulic fluid discharged from the second discharge port Q2 are changed. In these manners, the ratio can be changed between the flow rate of hydraulic fluid flowing into the cylinder chamber 81 of the left hydraulic clutch CL and the flow rate of hydraulic fluid flowing into the cylinder chamber 91 of the right hydraulic clutch CR, allowing to perform distribution control of driving force to the rear wheels WRL, WRR.

As described above, the driving force distributing device 50 of the present embodiment includes the single vane pump 10 for supplying control hydraulic pressure to each of the left hydraulic clutch CL and the right hydraulic clutch CR, the electric motor 36 for driving the vane pump 10, and the moving system (flow rate variable mechanism) 40 for changing the ratio of flow rate of hydraulic fluid supplied to each of the left hydraulic clutch CL and the right hydraulic clutch CR from the vane pump 10 and the control section 45 for controlling the electric motor 36 and the movement mechanism 40. And, on the basis of the control of changing the ratio of flow rate of hydraulic fluid supplied from the vane pump 10 to each of the left hydraulic clutch CL and the right hydraulic clutch CR using the moving mechanism 40 and the control of the rotational speed of the vane pump 10 using the electric motor 36, the flow rate of hydraulic fluid supplied to the left hydraulic clutch CL from the vane pump 10 and the flow rate of hydraulic fluid supplied to the right hydraulic clutch CR from the vane pump 10 are variably and separately controlled, thereby controlling driving force distributed to each of the pair of left and right driving wheels (auxiliary driving wheels) WRL, WRR.

In the driving force distributing device 50 of the present embodiment, the flow rate of hydraulic fluid supplied to the left hydraulic clutch CL from the vane pump 10 and the flow rate of hydraulic fluid supplied to the right hydraulic clutch CR can be variably and separately controlled in a simple configuration including the single vane pump 10. Thus, as a configuration for separately controlling each of the left hydraulic clutch CL and the right hydraulic clutch CR, the driving force distributing device 50 of the present embodiment never requires two sets of pump and linear solenoid valve as a conventional driving force distributing device does. Furthermore, the driving force distributing device 50 of the present embodiment never requires two pumps and two sets of electric motor and motor driver for driving these pumps. Therefore, by controlling the flow rate of hydraulic fluid supplied to the two hydraulic clutches CL, CR, driving force distributed to each of the pair of left and right driving wheels WRL, WRR can be controlled in a simple configuration with a small parts count.

Also, in the driving force distributing device 50 of the present embodiment, the vane pump 10 includes the housing 11, the rotor 22 rotatably installed inside of the housing 11, the first and second oil chambers H1, H2 defined on the outer peripheral side of the rotor 22 inside of the housing 11, the first and second inlet ports P1, P2 for sucking hydraulic fluid into the first and second oil chambers H1, H2 and the first and second discharge ports Q1, Q2 for discharging hydraulic fluid from the first and second oil chambers H1, H2. And, the moving mechanism 40 is a mechanism for changing the ratio between the capacity V1 of the first oil chamber H1 and the capacity V2 of the second oil chamber H2.

According to this configuration, in the vane pump 10 having two sets of inlet/discharge ports, and establishing the two routes to discharge destination of hydraulic fluid multiple times by performing suction/discharge process per rotation of the rotor 22, the flow rate of hydraulic fluid discharged from each of the first and the second discharge ports Q1, Q2 can be variably controlled separately on the basis of the control of changing the ratio between the capacity of the first oil chamber H1 and the capacity of the second oil chamber H2 and the control of rotational speed of the rotor 22 using the electric motor 36.

Further, in the driving force distributing device 50 of the present embodiment, the moving mechanism 40 is a mechanism for relatively moving the cam ring 30 installed to the housing 11 with respect to the rotor 22 and the rotating shaft 21. According to this configuration, the ratio between the capacity V1 of first oil chamber H1 and the capacity V2 of the second oil sac H2 can be changed by relatively moving the cam ring 30 with respect to the rotor 22 and the rotating shaft 21 using the moving mechanism 40. Therefore, the flow rate of hydraulic fluid discharged from each of the first and second discharge ports Q1, Q2 can be variably controlled separately in a simple configuration and control.

Also, in the driving force distributing device 50 of the present embodiment, the first and second discharge ports Q1, Q2 of the vane pump 10 are connected respectively to the cylinder chamber 81 of the left hydraulic clutch CL and the cylinder chamber 91 of the right hydraulic clutch CR. Thus, by variably controlling the flow rate of hydraulic fluid supplied to each of the left hydraulic clutch CL and the right hydraulic clutch CR separately using the vane pump 10, driving force is distributed to each of the pair of left and right driving wheels WRL, WRR.

According to this configuration, by variably controlling the flow rate of hydraulic fluid supplied to each of the left hydraulic clutch CL and the right hydraulic clutch CR separately, using the vane pump 10 of the variable capacity-type of the above-described configuration, driving force can be distributed to each of the pair of left and right driving wheels WRL, WRR. Therefore, even in the simple configuration including only the single vane pump 10, the driving force distributing device can control each of the plurality (two) of hydraulic clutches CL, CR separately.

Though the embodiment of the present invention is as described above, the present invention is not limited to the above-mentioned embodiment, and various deformations can be achieved within a range of the technical ideas described in Claims, Specification, and Drawings.

For example, on one hand, in the above-described embodiment, the above-described moving mechanism 40 with which the vane pump 10 is provided is described as an example of the flow rate variable mechanism for changing the ratio between the flow rate of hydraulic fluid supplied to each of the first and second hydraulic clutches from the pump in accordance with the present invention. On the other hand, the flow rate variable mechanism in accordance with the present invention may have another configuration than the above-described moving system, as long as it can change the ratio of flow rate of hydraulic fluid supplied to each of the first and second hydraulic clutches from the pump.

Also, on one other hand, in the above-described embodiment, the moving mechanism 40 for relatively moving the cam ring 30 with respect to the rotor 22 and the rotating shaft 21 was described as an example of the moving mechanism in accordance with the present invention. On the other hand, the moving mechanism in accordance with the present invention may have another configuration than the moving mechanism 40 of the above-described configuration, as long as it relatively moves the housing of the pump or a member installed to the housing, the rotor and the rotating shaft. Therefore, for example, the moving mechanism may be one that relatively moves the rotor of the pump and the rotating shaft with respect to the housing or the member on the housing side, whose diagrammatic representation and detailed description are omitted herein.

The invention claimed is:

1. A driving force distributing device comprising a first hydraulic clutch and a second hydraulic clutch for distributing driving force from a driving source to each of a pair of driving wheels,
the driving force distributing device for distributing driving force to each of the pair of driving wheels by variably controlling engaging force of each of the first and second hydraulic clutches according to running conditions of a vehicle,
the driving force distributing device comprising:
a single pump for supplying control hydraulic pressure to each of the first and second hydraulic clutches;
an electric motor for driving the pump;
a flow rate variable mechanism for changing a ratio of flow rate of hydraulic fluid supplied from the pump to each of the first and second hydraulic clutches;
a control means for controlling the electric motor and the flow rate variable mechanisms;
a first orifice provided in an oil passage which hydraulic oil discharged from the first hydraulic clutch flows, wherein the first orifice is connected to a first chamber; and a second orifice provided in an oil passage which hydraulic fluid discharged from the second hydraulic clutch flows, wherein the second orifice is connected to s second oil chamber,
wherein the pump comprises:
a housing;
a rotor rotatably arranged in the housing; and
the first oil chamber and the second oil chamber defined on an outer peripheral side of the rotor in the housing,
wherein the flow rate variable mechanism changes a ratio between a capacity of the first oil chamber and a capacity of the second oil chamber by relatively moving the housing or a member installed to the housing, the rotor, and a rotating shaft with respect to each other, and wherein the driving force distributing device controls driving force distributed to each of the pair of driving wheels by variably controlling a flow rate of hydraulic fluid supplied to the first hydraulic clutch from the pump and a flow rate of hydraulic fluid supplied to the second hydraulic clutch from the pump separately on the basis of a control of changing the ratio of the flow rate of hydraulic fluid supplied to each of the first and second hydraulic clutches from the pump in the flow rate variable mechanism and a control of a rotational speed of the pump using the electric motor.

2. The driving force distributing device according to claim 1,
first and second oil chambers defined on an outer peripheral side of the rotor in the housing; and
first and second inlet ports for sucking hydraulic fluid into the first and second oil chambers.

3. The driving force distributing device according to claim 2,
wherein the first and second discharge ports of the pump are connected respectively to cylinder chambers of the first and second hydraulic clutches, and
wherein the driving force distributes device distributing driving force to each of the pair of left and right driving wheels by variably and separately controlling a flow rate of hydraulic fluid supplied to the first and second hydraulic clutches respectively from the first and second discharge ports.

4. The driving force distributing device according to claim 1, wherein the pump is a vane-type pump comprising a plurality of vanes held by the rotor.

5. The driving force distributing device according to claim 2,
wherein the first and second discharge ports of the pump are connected respectively to cylinder chambers of the first and second hydraulic clutches, and
wherein the driving force distributes device distributing driving force to each of the pair of left and right driving wheels by variably and separately controlling a flow rate of hydraulic fluid supplied to the first and second hydraulic clutches respectively from the first and second discharge ports.

6. The driving force distributing device according to claim 1, wherein the pump is a vane-type pump comprising a plurality of vanes held by the rotor.

7. The driving force distributing device according to claim 2, wherein the pump is a vane-type pump comprising a plurality of vanes held by the rotor.

8. The driving force distributing device according to claim 3, wherein the pump is a vane-type pump comprising a plurality of vanes held by the rotor.

9. The driving force distributing device according to claim 5, wherein the pump is a vane-type pump comprising a plurality of vanes held by the rotor.

* * * * *